(No Model.)
J. WINTERBOTHAM.
HOOP POLE SPLITTING MACHINE.
No. 292,973. Patented Feb. 5, 1884.
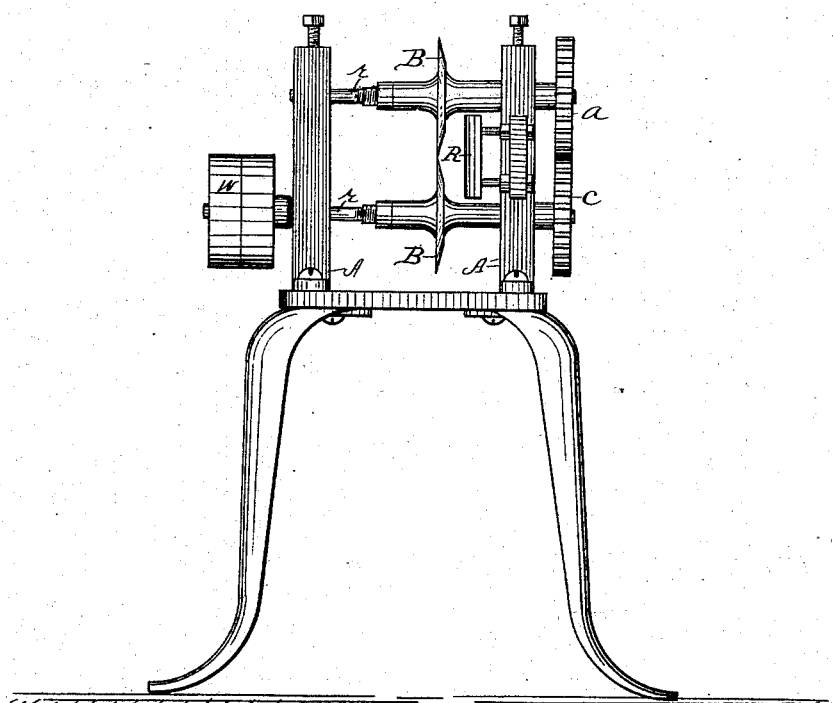
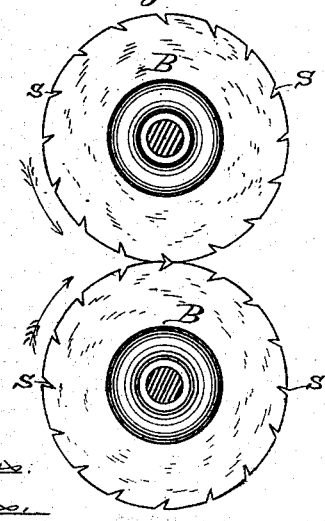
Witnesses
Thos. J. Hutchins
Wm. J. Hutchins
Inventor
Joseph Winterbotham

UNITED STATES PATENT OFFICE.

JOSEPH WINTERBOTHAM, OF JOLIET, ILLINOIS.

HOOP-POLE-SPLITTING MACHINE.

SPECIFICATION forming part of Letters Patent No. 292,973, dated February 5, 1884.

Application filed November 15, 1883. (No model.)

*To all whom it may concern:*

Be it known that I, JOSEPH WINTERBOTHAM, a citizen of the United States of America, residing at Joliet, in the county of Will and State of Illinois, have invented certain new and useful Improvements in Hoop-Pole-Splitting and Hoop-Cutting Machines, of which the following is a specification, reference being had therein to the accompanying drawings.

Figure 1 is a front elevation, and Fig. 2 is a side view, of the rotary cutting-knives.

This invention relates to certain improvements in hoop-pole-splitting and hoop-cutting machines of that class where the hoop-pole is passed lengthwise between the cutting-edges of a pair of rotary cutting-knives, having their peripheries set near enough together so as to slice, split, or cut off a hoop from the hoop-pole.

The improvement in this machine consists, principally, in forming the cutting-edges of the rotary knives so that they will feed and draw the hoop-pole through the machine through between the cutting-knives, which improvement is shown particularly in Fig. 2.

Referring to the drawings, B B represent the two rotary cutting-knives, having their cutting-peripheries notched in the form shown in Fig. 2. These cutting-knives rotate in the direction of the arrows, and the notches S are so cut that they form teeth that catch into the hoop-pole and propel it forward between the rotary knives B B without the use of any other feed. Heretofore these rotary knives have been constructed with plain cutting-peripheries without teeth or notches, and could not, unassisted, feed the hoop-pole through between the knives, as stated. The form of the notches may be varied, but should be such as to propel the pole, as stated.

Fig. 1 shows the rotary knives B B set in the frame A on the shafts *r r*, connected by the cog-wheels *a* and *c*, and driven by means of a belt on the pulley *w*. An adjustable guide, R, serves to guide the hoop-pole properly through between the knives B. If desired, only one of the knives B may be provided with the feed-notches S, and the feed-notches may be set or placed any distance apart that may be required for different kinds of work or wood. These notches S are far enough apart to leave cutting-edges between each notch, and the notches, instead of forming teeth like a saw with cutting chisel-edges, simply terminate in a sharp point that operates like a hook to penetrate and draw the hoop forward between the knives, as stated.

Having thus described my invention, what I claim as new, and desire to secure by Letters Patent, is as follows, to wit:

In the hoop cutting and splitting machine described, the rotary knives B B, arranged to stand, as shown, with their cutting-peripheries nearly or quite in contact with each other, and having their cutting-peripheries provided with a series of notches, S, forming teeth or hooks set far enough apart to leave cutting-edges between them, and adapted to feed or propel the hoop-pole through between said rotary knives by means of said teeth or hooks, as and for the purpose set forth.

JOSEPH WINTERBOTHAM.

Witnesses:
WM. J. HUTCHINS,
THOS. H. HUTCHINS.